Figure 1:
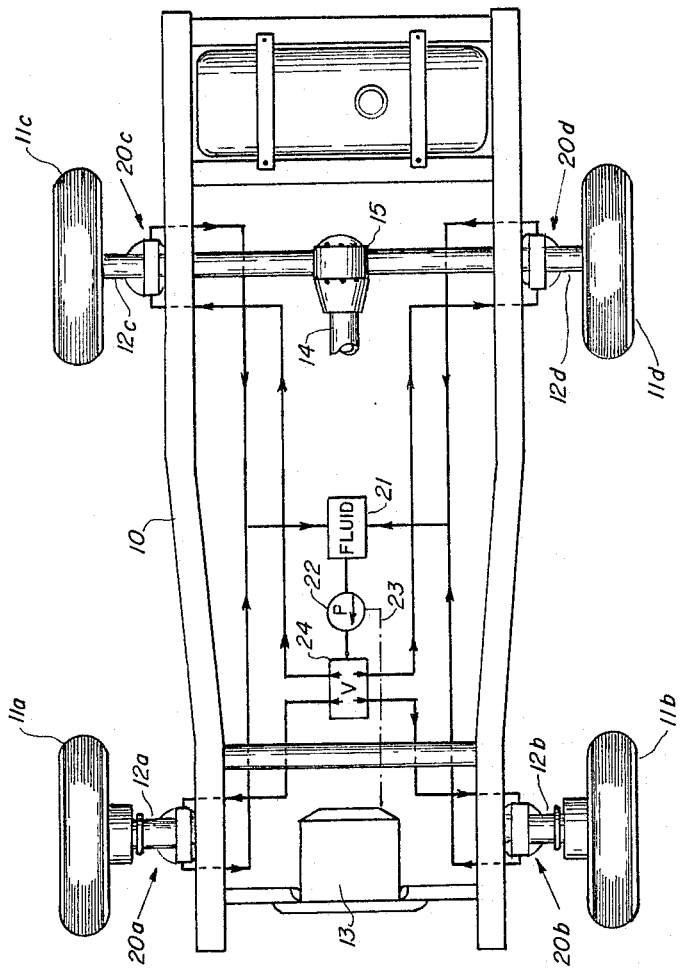

Sept. 27, 1966   F. OSTWALD   3,275,314
FLUID CUSHION

Filed Sept. 1, 1964   2 Sheets-Sheet 1

INVENTOR.
FRITZ OSTWALD
BY
Mestern, Ross & Mestern

INVENTOR.
FRITZ OSTWALD
BY
Mestern, Ross & Mestern

United States Patent Office 3,275,314
Patented Sept. 27, 1966

3,275,314
FLUID CUSHION
Fritz Ostwald, Buchschlag, Germany, assignor to Alfred Teves, Maschinen und Armaturenfabrik K.G., Frankfurt am Main, Germany, a German company
Filed Sept. 1, 1964, Ser. No. 393,555
11 Claims. (Cl. 267—64)

My present invention relates to a fluid cushion adapted to be used, for example, for the resilient support of the chassis of an automotive vehicle on its wheel axles.

Metallic springs and other elastically deformable elements have a definite characteristic according to which, as is well known, the reaction force resisting deformation is at least approximately proportional to the magnitude of the deformation itself, i.e., to the length of the compression stroke in the case of an expanding coil spring. The storage of this reaction force in the deformed spring element creates, upon cessation of the original force, a restoring oscillatory motion whose frequency depends upon the coefficient of elasticity of the element and upon the inertia of the movable mass. In automotive vehicles, for example, these parameters are generally so chosen that the oscillation in response to vertical forces of short duration, such as the jolts and bumps encountered upon travel over rough roads, give rise to relatively long-term oscillations, e.g., of a frequency corresponding to that of the human walk. Similar characteristics are obtainable with gaseous cushions, owing to the resilient compressibility of gases, yet the difficulty of maintaining a permanent fluid-tight seal militates against the use of such cushions in commerical vehicles. Hydraulic fluids, on the other hand, have no inherent resiliency and have therefore been used heretofore only in shock absorbers with an aperiodic characteristic, operating on the dashpot principle.

One drawback of mechanical spring cushions is their limited adjustability to long-term changes in load. Thus, a set of springs properly supporting the frame of a lightly loaded vehicle may no longer afford a satisfactory suspension when the vehicle is occupied by additional passengers. Moreover, metallic springs are known to fatigue so that their performance deteriorates with age.

It is, therefore, an object of my present invention to provide a resilient support, usable inter alia for automotive suspension systems, which is substantially free from the aforestated drawbacks and relies upon the easily regulated flow of a fluid medium to establish a desired characteristic of resiliency substantially independent of long-term load changes.

Another object of this invention is to provide a suspension system for automotive vehicles which will exert a cushioning effect only when the vehicle engine is running and which at other times will establish a substantially rigid connection between the vehicle frame and the wheel axles, thereby preventing undesirable oscillations of the vehicle body upon its transportation on a car ferry or other conveyance.

The foregoing objects are realized, in accordance with this invention, by a fluid cushion comprising one or more cylinders traversed by a working fluid, more specifically a hydraulic liquid, which is delivered to a piston chamber inside the cylinder under the pressure of a forced-circulation device, such as a pump, and which can escape from the chamber only when the pressure built up inside the chamber exceeds the biasing force acting upon a valve body normally blocking an outlet from that chamber. This valve body, in turn, is resiliently coupled with a piston having a head slidable inside the cylinder, this piston being connected with a load (specifically with a wheel axle of a vehicle whose frame is rigid with the cylinder) and being so disposed that its displacement in response to an increase in the loading force augments the fluid pressure in the chamber which in turn is communicated to a face of the valve member in a sense opposing its biasing force. The resilient coupling between the piston and the valve member, on the other hand, increases the biasing forces so that a greater pressure must be maintained in the chamber for continued circulation of the fluid, this additional pressure effectively representing a stored reaction force tending to restore the original balance, upon return of the loading force to its previous value, in much the same manner as does a resiliently deformable spring member.

Advantageously, in accordance with another feature of my invention, the valve body is constructed as a differential piston in which the aforementioned face, acted upon in a valve-opening sense by the fluid pressure of the chamber, is located at an end of the valve body remote from that chamber and communicating with it via a suitable channel which may be in the form of an axial bore in the valve body itself; the other end of the valve body faces the piston head and has an effective area only slightly smaller than that of the aforementioned face so that only a fraction of the pressure prevailing inside the chamber opposes the biasing force which acts in a valve-closing sense. This biasing force is derived at least in part from the resilient coupling between the piston and the valve body, constituted advantageously by a pair of counteracting springs engaging an extension of the valve body in an axial bore of the piston rod which communicates with the fluid chamber of the cylinder; a supplemental biasing spring may act upon the valve body outside that chamber.

The pressure of the fluid-circulating pump may be utilized to unblock a pair of check valves in the inlet and outlet of the cylinder chamber, with the result that circulation is completely blocked whenever the pump is at standstill whereby the piston is immobilized within the chamber. This is desirable, for the reasons outlined above, in an automotive vehicle in which a hydraulic cushion of the type set forth forms part of the suspension of the vehicle frame at each wheel, advantageously with the cylinder rigidly joined to the frame and with the piston secured to the respective wheel axle.

Figure 2:
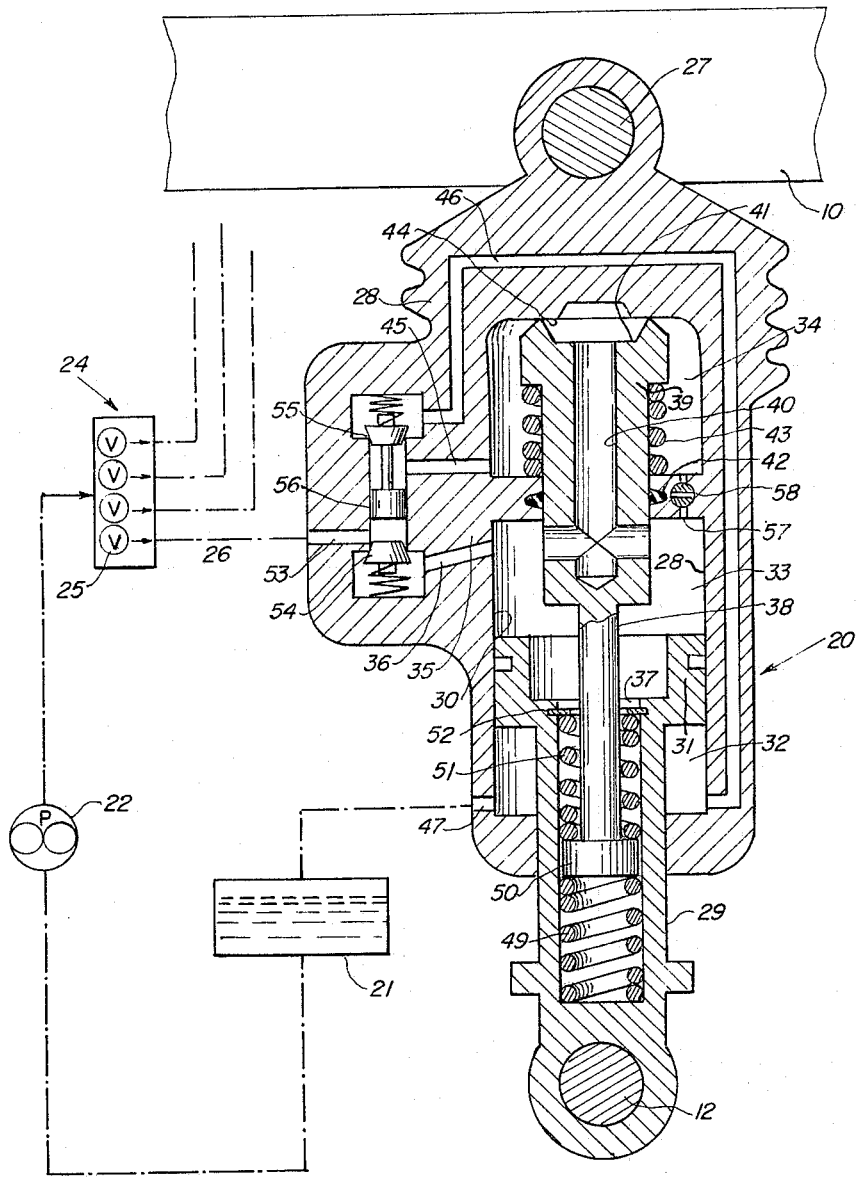

The invention will be described in greater detail with reference to the accompanying drawing in which:

FIG. 1 is a partly diagrammatic plan view of a vehicle chassis provided with a suspension system incorporating four hydraulic cushions according to the invention; and FIG. 2 is an enlarged view, in axial section, of one of the fluid cushions shown in FIG. 1.

In FIG. 1, I have shown the frame 10 of an automotive vehicle with two front wheels 11a, 11b and two rear wheels 11c, 11d, mounted on respective axles 12a, 12b and 12c, 12d, rear axles 12c, 12d are driven from an engine 13 via a shaft 14 and a conventional differential 15. The front axles 12a, 12b are linked to the steering wheel of the vehicle, not shown, in the usual manner.

A fluid cushion 20a, 20b, 20c, 20d, according to my invention, more fully described hereinafter in connection with FIG. 2, suspends each of the axles 12a–12d from the vehicle frame 10. A reservoir 21, containing a supply of hydraulic fluid, as included in a hydraulic circuit which further comprises a pump 22, driven by the engine 13 via a transmission 23, and a distributor 24 directing the output of pump 22 to the several fluid cushions. As more clearly shown in FIG. 2, distributor 23 comprises four throttle valves 25 which may be independently adjustable and divide the flow between four channels 26 leading to the fluid cushions associated with the four wheels of the vehicle.

In FIG. 2, I have shown in detail a single fluid cushion 20 representative of each of the four units 20a–20d illustrated in FIG. 1. A bolt 27 connects the vehicular frame 10 to the top of a cylinder 28 constituting one of the two relatively movable elements of the device 20, the other movable element being a piston 29 whose lower end embraces the corresponding wheel axle here generally designated 12. Cylinder 28 defines a chamber 30 which is subdivided by the head 31 of piston 29 into a lower compartment 32 and an upper compartment 33, the latter being in turn separated from a further compartment 34 by a rigid partition 35. Compartment 33 has an inlet 36 and communicates with an axle bore 37 in the piston 29, this bore receiving a downward extension 38 of a valve body 39 formed with an internal channel 40. The upper face of valve body 39 forms a recess 41 of a diameter only slightly larger than that of the generally cylindrical valve body in the region where this body penetrates the partition 35 with interposition of a gasket 42, the recess 41 communicating with compartment 33 by way of the channel 40 so that the valve body 39 acts as a differential piston urged downwardly by a fraction of the fluid pressure prevailing in compartment 33. This fluid pressure is counteracted by a biasing spring 43 tending to lift the valve body 39 and to keep it in contact with an annular shoulder 44 at the top of the cylinder, thereby cutting off the channel 40 and the compartment 33 from an outlet 45 communicating with compartment 34. An extension 46 of that outlet forms a passage which terminates at the lower compartment 32, which is substantially at atmospheric pressure since its discharge port 47 communicates via a line 48 with the reservoir 21. A further spring 49 in piston bore 37 acts upwardly upon the enlarged lower end 50 of valve extension 38, thereby supplementing the force of biasing spring 43, while a further spring 51 is inserted between the formation 50 and a retaining ring 52 at the entrance of bore 37 to balance the force of spring 49 in a neutral position in which the fluid pressure in compartment 33 overcomes the force of spring 43 to maintain the valve bdy 39 spaced from the top 44 of cylinder 28.

Inlet 36 receives its supply of hydraulic liquid from pump 22 and distributor 24 by way of an entrance port 53 and a spring-loaded check valve 54 interposed between the passages 53 and 36. Another spring-loaded check valve 55 lies between the passage 45 and 46 and is rigid with a plunger 56 facing the valve 54 the pressure of the fluid entering at 53 acting upon both the valve 54 and the plunger 56, thus also upon valve 55 to unblock the fluid path from entrance 53 to exit 47 as soon as the valve member 39 is forced downwardly by the fluid pressure from its illustrated position of closure. Hydraulic liquid from reservoir 21 thus circulates through the unit 20 as soon as the pump 22 is set in operation, e.g., when the vehicular engine 13 of FIG. 1 is started.

When a jolt hits the axle 12, piston 29 is driven upwardly and momentarily augments the fluid pressure in compartment 33, thereby tending to open the valve more widely by further separating the member 39 from its seat 44. A counteracting pressure is, however, imparted to the valve member 39 by the added compression of spring 49 bearing upwardly upon valve extension 38, 50; because of the inertia of the valve body 39, however, this counteracting force is not immediately effective so that only a relatively slight increase in fluid pressure occurs within compartment 33 in response to impacts of short duration. This slight increase in fluid pressure creates a restoring force whose magnitude, though suitable arrangement of the parts, may be so chosen as to result in a desired spring characteristic for the fluid cushion 20. If the changeloading force applied between points 12 and 27 is of longer duration, the system finds a new equilibrium in which the spacing of the valve surfaces 41, 44 is adjusted to the biasing force now prevailing as a result of the added or reduced compression of spring 49; the hydraulic pressure in compartment 33 is, of course, correspondingly altered to balance this biasing force. Such a change may occur, for example, when the vehicle receives or discharges passengers or goods. In the new condition, again, impacts of short duration will be elastically absorbed in the manner previously described.

The partition 35 may be provided with one or more orifices 57 (only one shown) and valves 58 selectively operable to block or unblock these orifices, whereby, if desired, the device 20 may be given a response characteristic most nearly resembling that of a shock absorber.

When the pump 22 is arrested, or if a leak develops in the supply line 26 of the device 20, the check valves 54, 55 close so that the piston head 31 is immobilized in chamber 30 and the spring action ceases. Thus, the frame 10 will remain supported on the axle even in the event of a defective supply line and will not cause the vehicle body to settle or tilt. A similar condition may, of course, be brought about by closing of the corresponding distributor valve 25.

The liquid present in the lwer compartment 32 does not exert any substantial pressure upon piston 29 but helps prevent leakages past its head 31, or minimize the effect of such leakages since any fluid seeping into the compartment 32 will be returned to the reservoir 21.

Modifications of the specific arrangement described and illustrated are, of course, possible without departing from the spirit and scope of my invention as defined in the appended claims.

I claim:

1. A fluid cushion comprising a cylinder provided with an inlet and an outlet for a working fluid, valve means in said outlet, biasing means urging said valve means into a position of closure, a conduit system including forced-circulation means connected to said inlet and outlet for driving said fluid through said cylinder, said valve means including a body with a face exposed to said fluid for partly overcoming the force of said biasing means under pressure of said forced-circulation means whereby said outlet is held open for the passage of said fluid at a controlled rate, and piston means in said cylinder movable relatively thereto under the action of a load for exerting a supplemental vallve-opening pressure on the fluid in said cylinder upon any increase in said load, said piston means being linked with said valve means by a resilient coupling including at least part of said biasing means, said resilient coupling counteracting the valve-opening pressure exerted upon said face by the fluid in said cylinder.

2. A fluid cushion comprising a cylinder provided with an inlet and an outlet for a hydraulic liquid, a reservoir for said liquid connected with said outlet, valve means in said outlet, biasing means urging said valve means into a position of closure, pump means having a high-pressure side connected to said inlet and a low pressure side connected to said reservoir for driving said liquid through said cylinder, said valve means including a body with a face exposed to said liquid for partly overcoming the force of said biasing means under pressure of said pump means whereby said outlet is held open for the passage of said liquid at a controlled rate, and a piston head in said cylinder having a projecting rod movable relatively thereto under the action of a load for exerting a supplemental valve-opening pressure on the liquid in said cylinder upon any increase in said load, said piston head being linked with said valve means by a resilient coupling including at least part of said biasing means, said resilient coupling counteracting the valve-opening pressure exerted upon said face by the liquid in said cylinder.

3. A fluid cushion as defined in claim 2, further comprising check-valve means in said conduit system for blocking the flow of said fluid therethrough upon deactivation of said forced-circulation means, thereby immobilizing said piston means relatively to said cylinder.

4. A fluid cushion as defined in claim 2 wherein said cylinder forms a chamber communicating with said inlet between said head and said body, the latter having a first end facing said chamber and a second end remote from said chamber constituting said exposed face, said cylinder and said second end being provided with coacting formations defining a fluid space communicating with said chamber, said space further communicating with said outlet upon mutual disengagement of said formations in response to differential fluid pressure upon said first and second ends, said biasing means bearing upon said body in a sense tending to maintain said formations mutually engaged.

5. A fluid cushion as defined in claim 4 wherein said body is formed with an internal channel communicating with said chamber in the region of said first end and terminating at said space in the region of said second end.

6. A fluid cushion as defined in claim 5 wherein said cylinder is provided with a passage extending from a location adjacent said space to a section of said chamber separated by said head from said inlet, said outlet opening into said section.

7. A fluid cushion as defined in claim 4, further comprising a first check valve in said inlet and a second check valve in said outlet both openable under pressure of said pump means and provided with spring means for closing said inlet and outlet in the absence of pump pressure, thereby immobilizing said head in said chamber during standstill of said pump means.

8. A fluid cushion as defined in claim 4 wherein said rod is formed with an axial bore open toward said chamber, said resilient coupling including an extension of said body projecting into said bore and a pair of counteracting springs bearing upon said extension and said rod within said bore.

9. A suspension system for a four-wheel vehicle including a support for the front and rear axles of said vehicle, said supports being constituted by two front and two rear fluid cushions each comprising a substantially vertical cylinder rigid with the vehicle frame and provided with an inlet and an outlet for a hydraulic liquid, a reservoir for said liquid connected with said outlet, valve means in said outlet, biasing means urging said valve means into a position of closure, pump means common to all four fluid cushions having a high-pressure side connected to said inlet and a low-pressure side connected to said reservoir for driving said liquid through said cylinder, said valve means including a body with a face exposed to said liquid for partly overcoming the force of said biasing means under pressure of said pump means whereby said outlet is held open for the passage of said liquid at a controlled rate, and a piston head in said cylinder having a projecting rod connected with the respective axle and movable relatively to its cylinder under the action of vertical loading forces for exerting a supplemental valve-opening pressure on the liquid in said cylinder upon any increase in said forces, said piston head being linked with said valve means by a resilient coupling including at least part of said biasing means, said resilient coupling counteracting the valve-opening pressure exerted upon said face by the liquid in said cylinder.

10. A system as defined in claim 9, further comprising distributor means connected to said high-pressure side, a set of four branch conduits respectively leading from said distributor means to the cylinders of said fluid cushions, and individual flow-control means in said branch conduits.

11. A system as defined in claim 9 wherein said vehicle has an engine driving said pump means, further comprising check-valve means in said inlet and outlet for blocking the circulation of said liquid through said cylinder in response to cessation of pressure from said pump means, thereby immobilizing said piston relatively to said cylinder upon standstill of said engine.

No references cited.

ARTHUR L. LA POINT, *Primary Examiner.*

R. M. WOHLFARTH, *Assistant Examiner.*